United States Patent [19]
Koike et al.

[11] Patent Number: 5,225,753
[45] Date of Patent: Jul. 6, 1993

[54] ELECTRIC CONTROL APPARATUS FOR FOUR-WHEEL STEERING SYSTEM

[75] Inventors: Shin Koike, Toyota; Osamu Takeda, Susono; Hiroaki Tanaka; Mizuho Sugiyama, both of Toyota; Kaoru Ohashi; Hitoshi Iwata, both of Okazaki; Masaru Ishikawa, Susono, all of Japan

[73] Assignee: Toyota Jidosha Kabushiki Kaisha, Toyota, Japan

[21] Appl. No.: 736,977

[22] Filed: Jul. 29, 1991

[30] Foreign Application Priority Data

Jul. 27, 1990 [JP] Japan .................. 2-199452

[51] Int. Cl.⁵ .............................. B62D 7/14
[52] U.S. Cl. ................... 318/560; 318/434; 318/587; 180/79.1; 180/140
[58] Field of Search ............... 318/560–646, 318/430–434; 180/140, 236, 234, 79.1; 280/91, 661, 696, 701; 364/424.01–426

[56] References Cited

U.S. PATENT DOCUMENTS

| | | | |
|---|---|---|---|
| 4,471,278 | 9/1984 | Matouka | 318/587 X |
| 4,657,102 | 4/1987 | Kanazawa et al. | 180/140 |
| 4,715,466 | 12/1987 | Ishii et al. | 180/140 X |
| 4,732,231 | 3/1988 | Kanazawa et al. | |
| 4,828,283 | 5/1989 | Ishii et al. | 180/140 X |
| 4,852,897 | 8/1989 | Takatani et al. | |
| 4,874,054 | 10/1989 | Watanabe | 180/140 |
| 4,951,198 | 8/1990 | Watanabe et al. | 180/140 |
| 4,972,916 | 11/1990 | Miller | 180/140 |
| 4,998,201 | 3/1991 | Mori | 180/140 X |
| 5,048,629 | 9/1991 | Abe et al. | 180/140 |
| 5,076,382 | 12/1991 | Vaughn et al. | 180/140 |
| 5,086,859 | 2/1992 | Takahashi et al. | 180/79.1 |

FOREIGN PATENT DOCUMENTS

| | | |
|---|---|---|
| 0280207 | 8/1988 | European Pat. Off. . |
| 0316932 | 11/1988 | European Pat. Off. . |
| 0312096 | 4/1989 | European Pat. Off. ............ 180/140 |
| 0404422 | 12/1990 | European Pat. Off. ............ 180/140 |
| 3814059 | 12/1988 | Fed. Rep. of Germany . |
| 0081257 | 5/1984 | Japan ................................. 180/140 |
| 0081263 | 5/1984 | Japan ................................. 180/140 |
| 0113651 | 5/1987 | Japan ................................. 180/140 |
| 0120276 | 6/1987 | Japan ................................. 180/140 |
| 0162162 | 6/1990 | Japan ................................. 180/140 |
| 0162163 | 6/1990 | Japan ................................. 180/140 |
| 0162165 | 6/1990 | Japan ................................. 180/140 |

*Primary Examiner*—Paul Ip
*Attorney, Agent, or Firm*—Cushman, Darby & Cushman

[57] ABSTRACT

In an electric control apparatus for a four-wheel steering system including an electric motor the rotary angle of which is electrically controlled in accordance with a target steering angle of rear road wheels, and a hydro-mechanical tracer mechanism having a fluid control valve the valve element of which is drivingly connected to the electric motor to be displaced in proportion to the rotary angle of the electric motor, the tracer mechanism being arranged to steer the rear road wheels in proportion to a displacement amount of the valve element, the target steering angle is converted into a control value for rotation of the electric motor, and a drive signal indicative of the control value is applied to the electric motor. The electric control apparatus is designed to greatly change the control value to and from zero when the target steering angle is less than a predetermined small angle and to change the control value in proportion to the target steering angle when the target steering angle is more than the predetermined small angle.

3 Claims, 5 Drawing Sheets

ELECTRIC CONTROL APPARATUS FOR FOUR-WHEEL STEERING SYSTEM

BACKGROUND OF THE INVENTION

1. Field of the Invention

The present invention relates to a four-wheel steering system in automotive vehicles, and more particularly to an electric control apparatus for the four-wheel steering system for controlling an actual steering angle of the rear road wheels to a target steering angle calculated in accordance with conditions of sensors detecting control factors for the rear road wheels.

2. Description of the Prior Art

In such a conventional control apparatus for a rear wheel steering mechanism as disclosed in Japanese Patent Early Publication No. 1-212667, a hydro-mechanical tracer mechanism is adapted to steer a set of rear road wheels at a calculated target steering angle. The hydro-mechanical tracer mechanism includes a fluid control valve the valve element of which is drivingly connected to an electric step motor to be axially displaced in proportion to leftward or rightward rotation of the step motor for controlling the steering angle of the rear road wheels. In the hydromechanical tracer mechanism, however, the fluid control valve is conditioned insensitive when the valve element is being displaced in a slight distance from its neutral position. For this reason, the rear road wheels may not be steered from their neutral positions even if the valve element is displaced in a slight distance from its neutral position in proportion to rotation of the step motor. This causes a difference between the actual steering angle of the rear road wheels and the calculated target steering angle. As a result, the rear road wheels may not be steered at the calculated target steering angle, and the steering response of the rear road wheels is deteriorated due to a time delay at the neutral position.

SUMMARY OF THE INVENTION

It is, therefore, a primary object of the present invention to provide an improved electric control apparatus for the four-wheel steering system capable of reliably steering the rear road wheels at the calculated target steering angle without any problem discussed above.

According to the present invention, the primary object is accomplished by providing an electric control apparatus for a four-wheel steering system which comprises calculation means for calculating a target steering angle of a set of rear road wheels, an electric motor the rotary angle of which is electrically controlled in accordance with the target steering angle, a hydro-mechanical tracer mechanism including a fluid control valve the valve element of which is drivingly connected to the electric motor to be displaced in proportion to the rotary angle of the electric motor, the tracer mechanism being arranged to steer the rear road wheels in proportion to a displacement amount of the valve element, conversion means for converting the target steering angle into a control value for rotation of the electric motor, means for applying a drive signal indicative of the control value to the electric motor for controlling the rotary angle of the electric motor, and means for greatly changing the control value to and from zero in accordance with the target steering angle when the target steering angle is less than a predetermined small angle and for changing the control value in proportion to the target steering angle when the target steering angle is more than the predetermined small angle.

In the case that an electric step motor is adapted as the electric motor, the electric control apparatus further comprises means for controlling a periodic time for applying a drive pulse indicative of the control value to the step motor to a first predetermined short period of time when the target steering angle is less than the predetermined small angle and for controlling the periodic time to a second predetermined period of time longer than the first predetermined short period of time when the target steering angle is more than the predetermined small angle.

BRIEF DESCRIPTION OF THE DRAWINGS

Additional objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
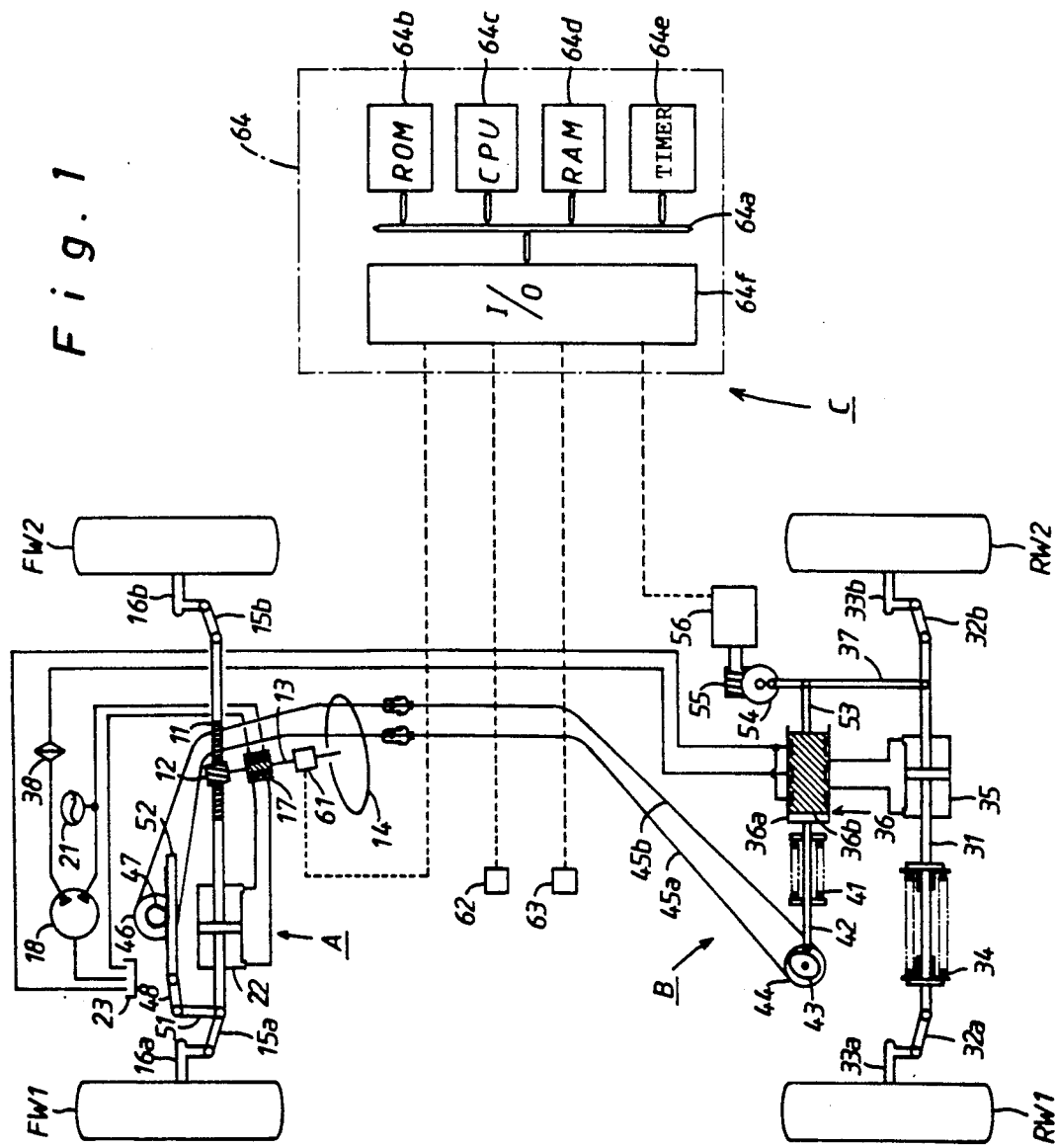
FIG. 1 is a schematic illustration of an electric control apparatus for a four-wheel steering system in an automotive vehicle.

In FIG. 1 of the drawings, there is schematically illustrated a four-wheel steering system in an automotive vehicle which comprises power-assisted front and rear wheel steering mechanisms A and B. The front wheel steering mechanism A includes a lateral rack bar 11 arranged to be axially displaced by operation of a steering wheel 14, a pair of tie rods 15a, 15b connected to opposite ends of rack bar 11 and a pair of knuckle arms 16a, 16b each connected to the tie rods 15a, 15b to steer a set of dirigible front road wheels FW1, FW2 in response to axial displacement of the rack bar 11. The steering wheel 14 is operatively connected to the rack bar 11 by means of a pinion 12 and a steering shaft 13. The steering shaft 13 has a direction control valve 17 provided thereon to selectively supply fluid under pressure from a hydraulic tandem pump 18 into a power cylinder 22 in accordance with a steering effort applied to the steering wheel 14. The power cylinder 22 is mounted on a vehicle body structure to assist axial displacement of the rack bar 11 in accordance with the fluid under pressure supplied thereto.

The rear wheel steering mechanism B includes a lateral operation rod 31 arranged to be axially displaced, a pair of tie rods 32a, 32b connected to opposite ends of the operation rod 31 and a pair of knuckle arms 33a, 33b each connected to the tie rods 32a, 32b to steer a set of dirigible rear road wheels RW1, RW2 in response to axial displacement of the operation rod 31. The operation rod 31 is loaded by a spring 34 to be retained in a neutral position and is assisted by operation of a power cylinder 35 assembled thereon. The power cylinder 35 is supplied with the fluid under pressure from the tandem pump 18 through a filter 38 under control of a spool valve 36 which is associated with a swingable lever 37 to provide a hydro-mechanical tracer mechanism. The spool valve 36 includes a valve sleeve 36a axially movably mounted on the vehicle body structure and a valve spool 36b disposed within the valve sleeve 36a for relative movement therewith. The valve sleeve 36a is connected to a drive rod 42 which is loaded by a spring 41 to be retained in a neutral position. The drive rod 42 is maintained in engagement with a cam member 43 which is secured to a pulley 44 for rotation therewith.

The pulley 44 is rotatably mounted on the vehicle body structure to be rotated by a pair of cables 45a, 45b connected thereto. The cables 45a, 45b are extended forwardly and connected at their front ends to a pulley 46 to rotate the cam member 43 with the pulley 44 in response to steerage of the front road wheels FW1, FW2. The pulley 46 is integrally provided thereon with a pinion 47 which is in meshing engagement with a sub-rack bar 52 operatively connected to the lateral rack bar 11 by means of connecting rods 48 and 51. When the front road wheels FW1, FW2 are steered by axial displacement of the rack bar 11, the pulley 46 is rotated clockwisely or counterclockwisely, and in turn, the cam member 43 is rotated by the cables 45a, 45b to cause axial displacement of the drive rod 42. In this embodiment, the drive rod 42 will be retained in its neutral position even if the cam member 43 is rotated at a small angle from its neutral position. The valve spool 36b is connected to one end of a connecting rod 53 the other end of which is pivoted to an intermediate portion of lever 37 in such a manner as to be axially slidable thereon. The swingable lever 37 is pivoted at its rear end to the operation rod 31 in such a manner as to be slidable perpendicularly thereto and is eccentrically pivoted at its front end to a toothed wheel 54 which is rotatably mounted on the vehicle body structure and in meshing engagement with a worm gear 55 mounted on an output shaft of an electric step motor 56 for rotation therewith.

An electric control apparatus for the rear wheel steering mechanism B includes a microcomputer 64 which is connected to a front wheel steering angle sensor 61, a vehicle speed sensor 62 and a yaw-rate sensor 63. The front wheel steering angle sensor 61 is mounted on the steering shaft 13 to produce an electric signal indicative of a steering angle $\theta_f$ of the front road wheels FW1, FW2. The vehicle speed sensor 62 is arranged to detect a rotational speed of an output shaft of the power transmission (not shown) for producing an electric signal indicative of a travel speed of the vehicle. The yaw-rate sensor 63 is mounted on the vehicle body structure to detect a rotational speed about a vertical axis at the center of gravity of the vehicle body for producing an electric signal indicative of a yaw-rate $\omega y$ acting on the vehicle body. In this embodiment, the steering angle $\theta_f$ is represented by a positive value when the front road wheels FW1, FW2 have been steered rightward and is represented by a negative value when the front road wheels FW1, FW2 have been steered leftward. The yaw-rate $\omega y$ is represented by a positive value in rightward turning of the vehicle and is represented by a negative value in leftward turning of the vehicle.

The microcomputer 64 includes a rear-only memory or ROM 64b, a central processing unit or CPU 64c, a random access memory or RAM 64d, a timer circuit 64e and an interface 64f which are connected in common to a bus line 64a. The ROM 64b is arranged to memorize a main control program shown by a flow chart in FIG. 2 and an interruption control program shown by a flow chart in FIG. 3 and to memorize first and second coefficients $K_1$, $K_2$ in the form of first and second tables shown in FIGS. 4A and 4B and a new step number Sn in relation to a target steering angle of the rear road wheels in the form of a third table shown in FIG. 5. The CPU 64c is arranged to execute the main and interruption control programs, and the RAM 64d is arranged to temporarily memorize variables required for execution of the main control program. The timer circuit 64e is designed to produce an interruption signal at a predetermined short time interval and apply it to the CPU 64c, and the interface 64f is arranged to be applied with the electric signals from sensors 61-63 and to apply therethrough a drive pulse from the CPU 64c to the step motor 56.

Figure 2:
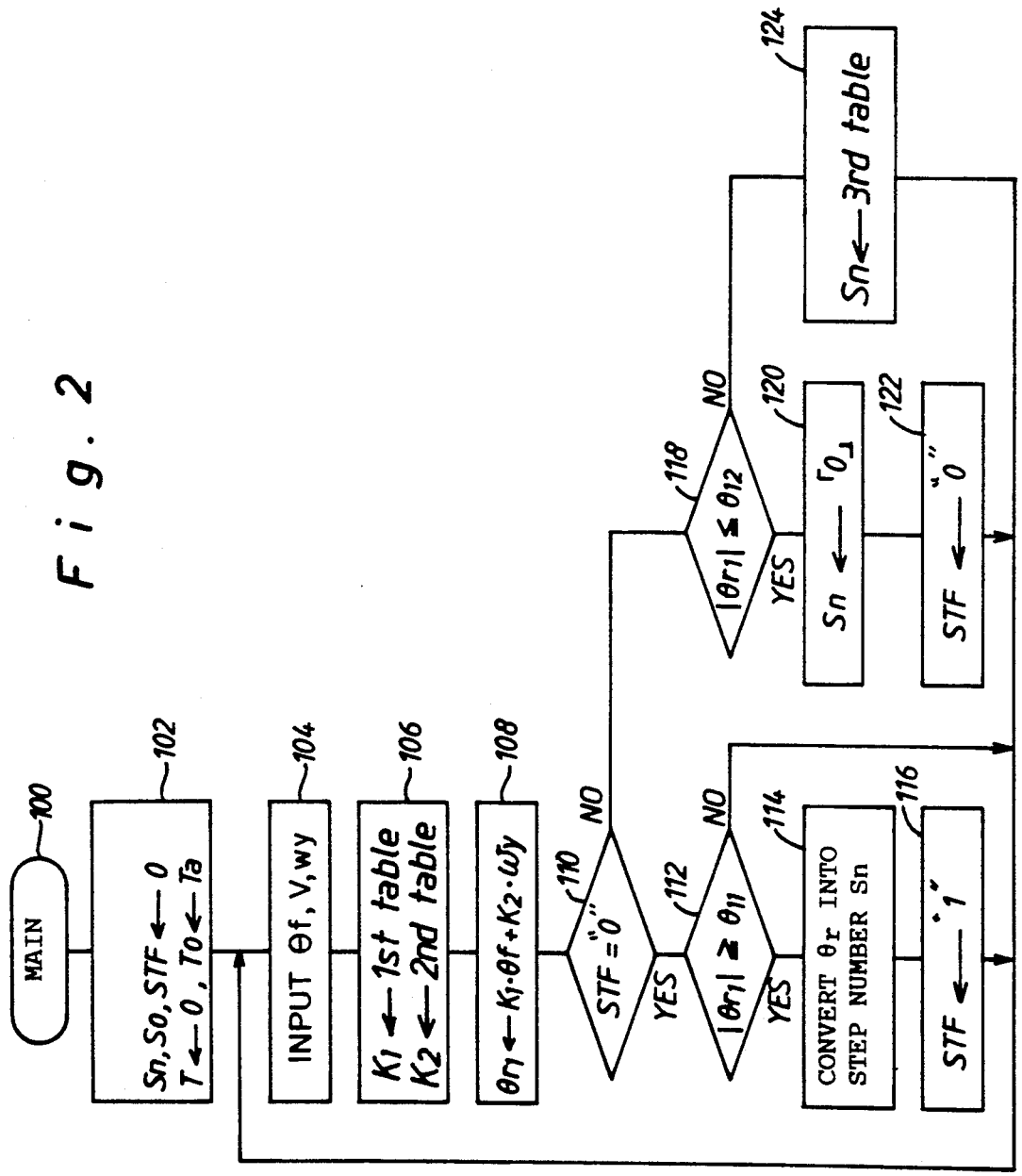
FIG. 2 is a flow chart illustrating a main control program to be executed by a microcomputer shown in FIG. 1.

Hereinafter, the operation of the electric control apparatus will be described with reference to FIGS. 2 and 3. Assuming that an ignition switch (not shown) of the vehicle has been closed, the CPU 64c is activated to initiate execution of the main control program at step 100 shown in FIG. 2. At the following step 102, the CPU 64c initializes new and old step numbers Sn, So, a condition flag STF and a count value T respectively as "0" and sets a reference value To as a first predetermined value Ta. After initialization at step 102, the CPU 64c executes processing at step 104-108 to calculate a target steering angle $\theta r_1$ of the rear road wheels RW1, RW2 in accordance with travel speed of the vehicle. At step 104, the CPU 64c reads out a front wheel steering angle $\theta_f$, a vehicle speed V and a yaw-rate $\omega y$ in response to the eletric signals from sensors 61-63 and defines at step 106 first and second coefficients $K_1$, $K_2$ in relation to the vehicle speed V on a basis of the memorized first and second tables shown in FIGS. 4A and 4B. Thus, the CPU 64c calculates at step 108 a target rear wheel steering angle $\theta r_1$ based on the following equation.

$$\theta r_1 = K_1 \cdot \theta_f + K_2 \cdot \omega y$$

Figure 4A:
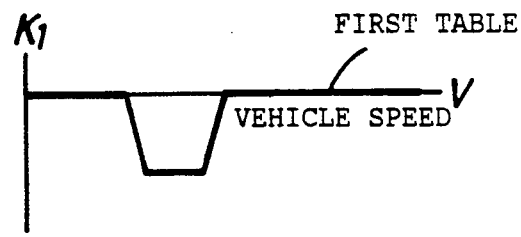
FIG. 4A is a graph showing a first coefficient in relation to the vehicle speed.
Figure 4B:
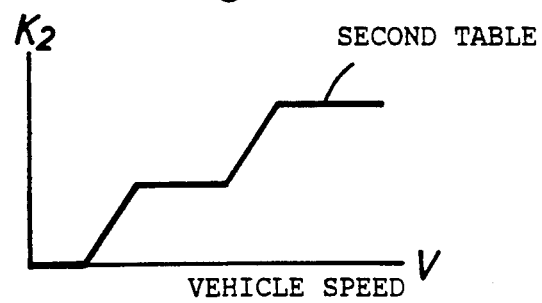
FIG. 4B is a graph showing a second coefficient in relation to the vehicle speed.

In this instance, the first coefficient $K_1$ is defined as a negative value during travel of the vehicle at a medium speed and is defined as "0" during travel of the vehicle at a low or high speed, as shown in FIG. 4A. Thus, the value of $K_1 \cdot \theta_f$ is calculated as a control value to facilitate turning of the vehicle at a medium speed. On the other hand, the second coefficient $K_2$ is successively increased from "0" in accordance with an increase of the vehicle speed V as shown in FIG. 4B. Thus, the value of $K_2$, $\omega y$ is calculated as a control value to enhance stability of the vehicle during travel of the vehicle at medium and high speeds.

After calculation of the target steering angle $\theta r_1$, the CPU 64c executes processing at step 110-124 to define a new step number Sn for rotation of the step motor 56 on a basis of the calculated target steering angle $\theta r_1$. At step 110, the CPU 64c determines as to whether the condition flag STF is "0" or not. In this embodiment, the condition flag STF is set as "0" when the new step number Sn has been previously defined as "0" and is set as "1" under the other condition. At this initial stage, the condition flag STF is previously set as "0" at step 102. This means the facts that the target steering angle $\theta r_1$ is calculated as "0" at start of the vehicle and that the new step number Sn for rotation of the step motor 56 is defined as "0". Since the condition flag STF is set as "0" at start of the vehicle, the CPU 64c determines a "YES" answer at step 110 and causes the program to proceed to step 112. Thus, the CPU 64c determines as to whether or not an absolute value of the target steering angle $\theta r_1$ is larger than or equal to a predetermined small positive value $\theta_{11}$ shown in FIG. 5. If the absolute value of the target steering angle $\theta r_1$ is less than the positive value $\theta_{11}$, the CPU 64c determines a "NO" answer at step 112 and returns the program to step 104.

When the absolute value of the target steering angle $\theta r_1$ becomes larger than the positive value $\theta_{11}$ by processing at step 104-108, the CPU 64c determines a "YES" answer at step 110 and determines a "YES" answer at step 112 for processing at step 114 and 116. At step 114, the CPU 64c refers to the memorized third table to convert the target steering angle $\theta r_1$ into a new step number Sn in accordance with linear portions A1, A2 shown in FIG. 5. Thus, the new step number Sn discontinuously changes from "0" to more than a value of $S_{11}$ or less than a value of $-S_{11}$. At the following step 116, the CPU 64c sets the condition flag STF as "1". In this embodiment, it is to be noted that the value of $S_{11}$ is determined to represent a step number for rotation of the step motor 56 in an insensitive range where the hydro-mechanical tracer mechanism does not respond to rotary movement of the step motor 56 due to insensitiveness of the spool valve 36.

When the program returns to step 104 after processing at step 116, the CPU 64c determines a "NO" answer at step 110 and executes processing at step 118-124. At step 118, the CPU 64c determines as to whether or not the absolute value of the target steering angle $\theta r_1$ is smaller than or equal to a positive value $\theta_{12}$ which is smaller than the value $\theta_{11}$. If the answer is "NO", the CPU 64c refers to the memorized third table at step 124 to convert the target steering angle $\theta r_1$ into a new step number Sn in accordance with the linear portions A1, A2 shown in FIG. 5. If the answer is "YES" at step 118, the CPU 64c sets the new step number as "0" at step 120 and sets the condition flag STF as "0" at step 122. Thus, the new step number Sn changes discontinuously from the value of more than $S_{12}$ or the value of less than $-S_{12}$ to "0", and in turn, the CPU 64c will convert the target steering angle $\theta r_1$ into a new step number by processing at step 110-116.

Figure 5:
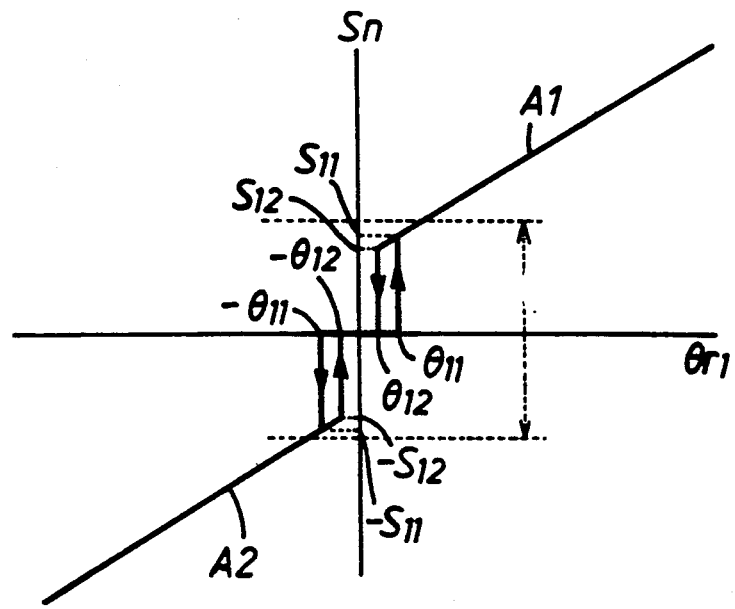
FIG. 5 is a graph showing a new step number in relation to a target steering angle of the rear road wheels calculated by the computer.
Figure 6:
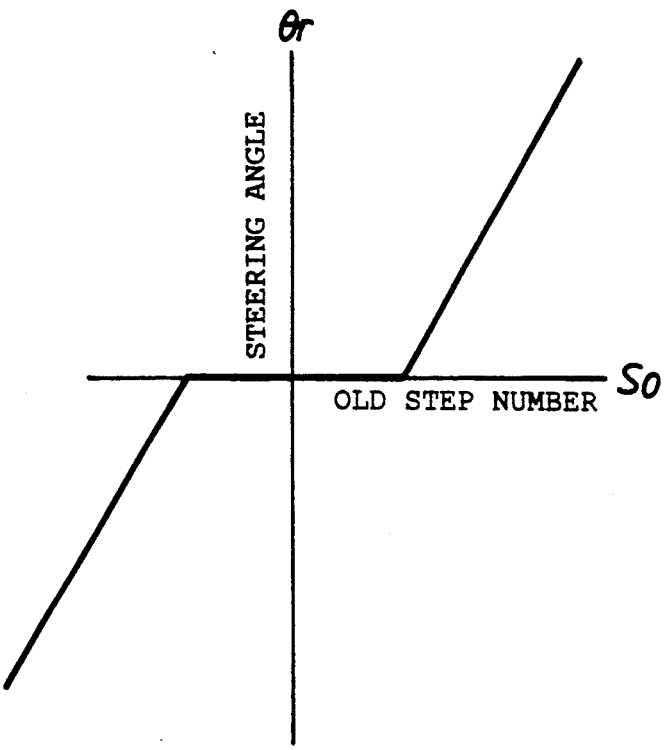
FIG. 6 is a graph showing a steering angle of the rear road wheels in relation to an old step number.

As is understood from the above description, the new step number Sn greatly changes to and from "0" in accordance with change of the target steering angle $\theta r_1$ by processing at step 110-124 when the target steering angle $\theta r_1$ is less than the predetermined small value ($\theta_{11}$ or $-\theta_{11}$), as shown in FIG. 5. When the target steering angle $\theta r_1$ is more than the predetermined small value, the new step number Sn changes in proportion to the target steering angle $\theta r_1$. In the case that the new step number Sn greatly changes to and from "0", it is desirable to apply a hysteresis characteristic to the step motor 56.

Figure 3:
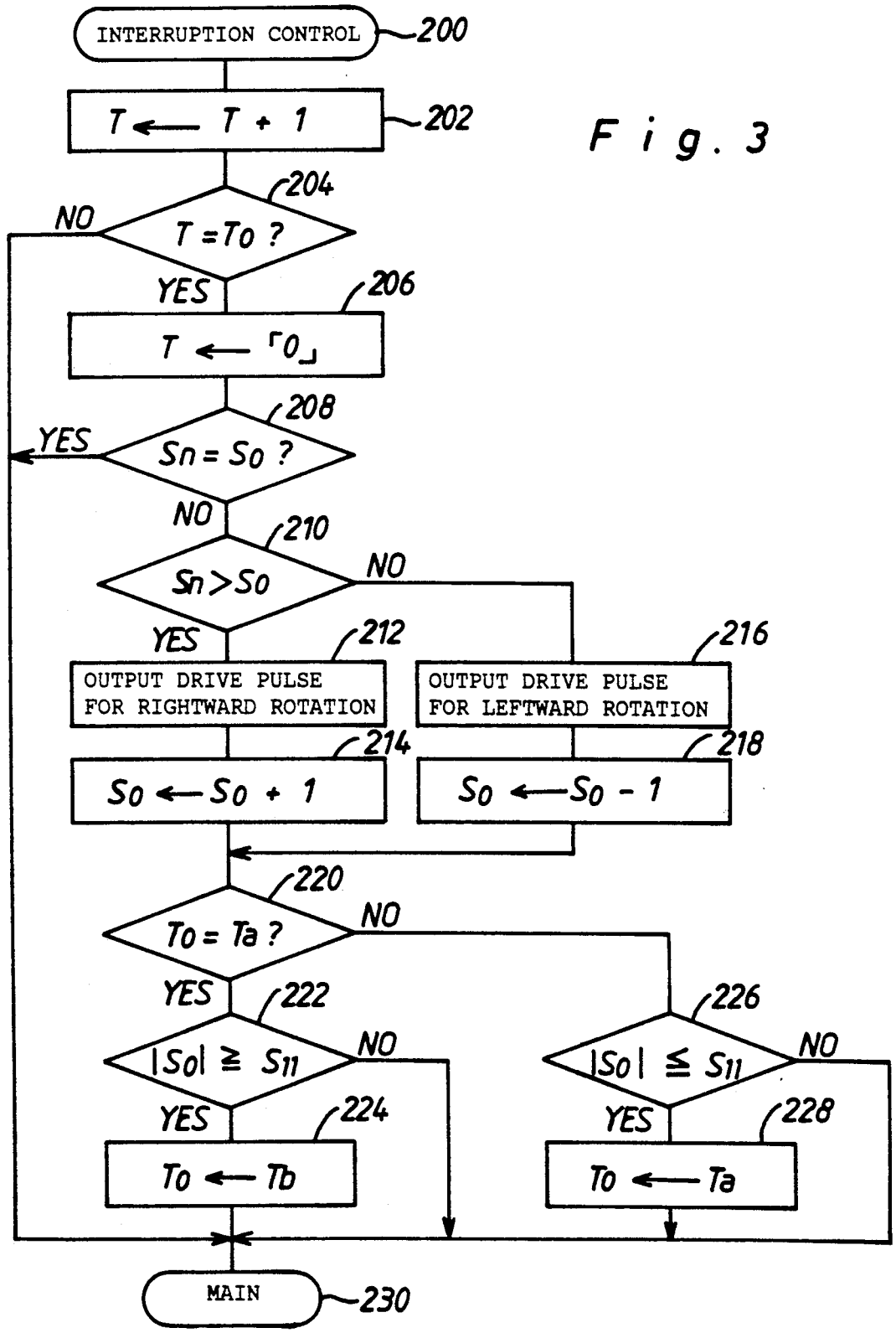
FIG. 3 is a flow chart illustrating an interruption control program to be executed by the microcomputer.

During repetitive execution of the main control program, the CPU 64c is applied with an interruption signal from the timer circuit 64e at the predetermined time interval to execute the interruption control program shown in FIG. 3 for controlling the rotary angle of step motor 56 on a basis of the new step number Sn. When applied with the interruption signal, the CPU 64c initiates execution of the interruption control program at step 200 to repetitively change the count value T from "0" to the reference value To by processing at step 202-206. The reference value To represents a periodic time for applying a drive pulse to the step motor 56 and is set as the first predetermined value Ta at the initial stage. When the count value T becomes equal to the reference value To by processing at step 202, the CPU 64c determines a "YES" answer at step 204 and sets the count value T as "0" step 206. At the following step 208, the CPU 64c determines as to whether or not the new step number Sn is equal to the old step number So. In this instance, the new step number Sn represents a target rotary angle of step motor 56, while the old step number So represents the present rotary angle of step motor 56. At the initial stage, the old step number So is set as "0" as described above.

If the answer is "NO" at step 208, the program proceeds to step 210 where the CPU 64c determines as to whether the new step number Sn is larger than the old step number So or not. Assuming that the step motor 56 is conditioned to be rotated rightward, the CPU 64c determines a "YES" answer at step 210 and produces at step 212 a drive pulse for rotating the step motor 56 rightward by one step. When applied with the drive pulse through the interface 64f, the step motor 56 rotates rightward by one step. After processing at step 212, the CPU 64c renews the old step number So by addition of "1" at step 214 to coincide the rotary angle of step motor 56 with the old step number So. When the step motor 56 is conditioned to be rotated leftward, the CPU 64c determines a "NO" answer at step 210 and produces at step 216 a drive pulse for rotating the step motor 56 leftward by one step. When applied with the drive pulse through the interface 64f, the step motor 56 rotates leftward by one step. After processing at step 216, the CPU 64c renews the old step number So by subtraction of "1" at step 218 to coincide the rotary angle of step motor 56 with the old step number So. Such processing at step 210-218 is executed until the new step number Sn coincides with the old step number So. When the new step number Sn becomes equal to the old step number So, the CPU 64c determines a "YES" answer at step 208 and ends execution of the interruption control program at step 230. Thus, the rotary angle of step motor 56 is controlled to a rotary angle defined by the new step number Sn.

When the step motor 56 has been rotated rightward or leftward by the drive pulse applied thereto in the manner described above, the rotation of step motor 56 causes the toothed wheel 54 to rotate clockwisely or counterclockwisely. As a result, the upper end of lever 37 is displaced leftward or rightward in accordance with the rotation amount of step motor 56 to cause axial movement of the valve spool 36b relative to the valve sleeve 36a. In this instance, the spool valve 36 will not respond to the axial movement of valve spool 36b if the valve spool 36b is in its neutral position. Thus, the rear road wheels RW1, RW2 will be retained by spring 34 in their neutral positions. Meanwhile, the CPU 64c determines as to whether or not the reference value To is set as the first predetermined value Ta at step 220 of the interruption control program.

If the reference value To is set as the first predetermined value Ta as described above, the CPU 64c determines a "YES" answer at step 220 and determines at step 222 as to whether or not the absolute value of the old step number So is larger than or equal to the value $S_{11}$ shown in FIG. 5. Since the value $S_{11}$ is determined to represent a step number of step motor 56 in the insensitive range of spool valve 36, the CPU 64c will determine a "NO" answer at step 222 if the step motor 56 and valve spool 36b are in their neutral positions respectively, and the reference value To will be maintained as the first predetermined value Ta. Since the first predetermined value Ta is determined to be a relatively small value, the periodic time for applying the drive pluse to the step motor 56 becomes short to rotate the step motor 56 at a high speed. This is caused by the fact that the load acting on the step motor 56 becomes small at the insensitive range of spool valve 36.

When the absolute value of old step number So becomes larger than the value $S_{11}$ in a condition where the reference value To is maintained as "Ta", the CPU 64c determines a "YES" answer at step 222 and sets the reference value To as a second predetermined value Tb. Since the second predetermined value Tb in this embodiment is determined to be a relatively large value (Ta<Tb), the periodic time for applying the drive pulse to the step motor 56 becomes long to rotate the step motor 56 at a low speed. The rotation control of step motor 56 is, therefore, smoothly effected in accordance with change of the new step number Sn even when the load acting on step motor 56 becomes large. After the reference value To has been set as the second predetermined value Tb, the CPU 64c determines a "NO" answer at step 220 and determines at step 226 as to whether or not the absolute value of old step number So is smaller than or equal to the value $S_{11}$. If the answer is "NO" at step 226, the reference value To is maintained as the second predetermined value Tb. If the answer is "YES" at step 226, the reference value To is set as the first predetermined value Ta.

When the axial displacement of valve spool 36b from its neutral position is increased by rotation of the step motor 56, the spool valve 36 is released from its insensitive range. In this instance, the power cylinder 35 is supplied with the fluid under pressure from the tandem pump 18 in accordance with the axial displacement of valve spool 36b to displace the operation rod 31 rightward or leftward, and in turn, the lever 37 cooperates with the valve spool 36b to eliminate the relative displacement of the valve spool 36b to the valve sleeve 36a in response to the axial displacement of operation rod 31. Thus, the rear road wheels RW1, RW2 are steered at the target steering angle $\theta r_1$. In such operation, the axial displacement amount of valve spool 36b from its neutral position is determined approximately in proportion to the rotation amount of step motor 56 from its neutral position, and the axial displacement amount of operation rod 31 is determined approximately in proportion to the displacement amount of valve spool 36b away from the insensitive range of spool valve 36. Thus, the rear road wheels RW1, RW2 are steered in proportion to the rotation of step motor 56 after the spool valve 63 has been released from its insensitive range.

Figure 7:
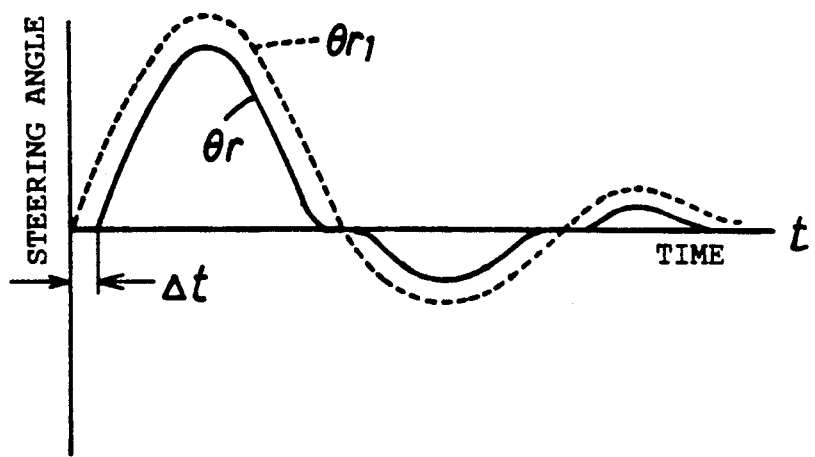
FIG. 7 is a time chart showing change of an actual steering angle of the rear road wheels in relation to the target steering angle.

As described above, the new step number Sn representing a target rotary angle of step motor 56 is converted from the calculated target steering angle $\theta r_1$ on a basis of the third table shown in FIG. 5. Thus, the new step number Sn is greatly changed in accordance with change of the calculated target steering angle $\theta r_1$ at the insensitive range of spool valve 36 and is changed in proportion to the calculated target steering angle $\theta r_1$ at the sensitive range of spool valve 36. As a result, the rear road wheels RW1, RW2 are reliably steered at the calculated target steering angle $\theta r_1$ without any influence caused by insensitivity of the spool valve 36 as shown in FIG. 7, and a delay time $\Delta t$ in steering operation at the neutral position becomes short. This is effective to enhance the steering response of rear road wheels RW1, RW2.

Additionally, the periodic time for applying the drive pulse is controlled to become short at the insensitive range of spool valve 36 and to become long at the sensitive range of spool valve 36. This is useful to eliminate asynchronization of the step motor 56 and to enhance the steering response of the rear road wheels. Furthermore, the step motor 56 is applied with the hysteresis characteristic when the calculated target steering angle $\theta r_1$ is converted into the new step number Sn at the insensitive range of spool valve 36. This is effective to eliminate frequent rotation of the step motor 56.

In this embodiment, the electric control of the rear wheel steering mechanism B described above will be effected only when the front road wheels are steered at a small angle. Under the electric control of the rear wheel steering mechanism B, the drive rod 42 and valve sleeve 36a are retained in their neutral positions even when the cam member 43 has been rotated at a small angle through cables 45a, 45b. When the front road wheels FW1, FW2 are steered at a large angle, axial displacement of the rack bar 11 causes the cam member 43 to rotate at a large angle. In this instance, the drive rod 42 is axially displaced in accordance with the rotary angle of cam member 43 to cause relative displacement between the valve sleeve 36a and valve spool 36b. Thus, the power cylinder 35 is supplied with the fluid under pressure from the tandem pump 18 under control of the spool valve 36 to displace the operation rod 31 thereby to steer the rear road wheels RW1, RW2. In this embodiment, the cam member 43 is formed to steer the rear road wheels RW1, RW2 in an opposite direction to the front road wheels FW1, FW2. This is useful to facilitate turning of the vehicle at a low speed.

What is claimed is:

1. An electric control apparatus for a four-wheel steering system in an automative vehicle having a set of dirigible front road wheels and a set of dirigible rear road wheels, comprising:

calculation means for calculating a target steering angle of the rear road wheels;

an electric motor the rotary angle of which is electrically controlled in accordance with the target steering angle;

a hydro-mechanical tracer mechanism including a fluid control valve the valve element of which is drivingly connected to said electric motor to be displaced in proportion to the rotary angle of said electric motor, said tracer mechanism being arranged to steer the rear road wheels in proportion to a displacement amount of said valve element;

conversion means for converting the target steering angle into a control value for rotation of said electric motor; and means for applying a drive signal indicative of the control value to said electric motor for controlling the rotary angle of said electric motor;

wherein the electric control apparatus further comprises means for greatly changing the control value to and from zero in accordance with the target steering angle when the target steering angle is less than a predetermined small angle and for changing the control value in proportion to the target steering angle when the target steering angle is more than the predetermined small angle.

2. An electric control apparatus for a four-wheel steering system as claimed in claim 1, wherein an electric step motor is adapted as said electric motor, and wherein the electric control apparatus further comprises means for controlling a periodic time for applying a drive pulse indicative of the control value to said step motor to a first predetermined short period of time when the target steering angle is less than the predetermined small angle and for controlling the periodic time to a second predetermined period of time longer than the first predetermined short period of time when the target steering angle is more than the predetermined small angle.

3. An electric control apparatus for a four-wheel steering system as claimed in claim 1, wherein an electric step motor is adapted as said electric motor, and said hydro-mechanical tracer mechanism includes a spool valve the valve spool of which is drivingly connected to said step motor to be axially displaced in proportion to the rotary angle of said step motor, said tracer mechanism being arranged to steer the rear road wheels in proportion to an axial displacement of said valve spool.

* * * * *